H. D. PRATT.

MACHINE FOR CLEANING RAILROAD BALLAST.

APPLICATION FILED OCT. 27, 1919.

Reissued Sept. 13, 1921. 15,195.

3 SHEETS—SHEET 1.

Witness
Edward T. Wray.

Inventor
Howell D. Pratt
by Parker & Carter
Attorneys

H. D. PRATT.

MACHINE FOR CLEANING RAILROAD BALLAST.

APPLICATION FILED OCT. 27, 1919.

Reissued Sept. 13, 1921.

15,195.

3 SHEETS—SHEET 2.

INVENTOR
HOWELL D. PRATT

Witness
Edward T. Wray by Parker & Carter
ATTORNEYS

H. D. PRATT.

MACHINE FOR CLEANING RAILROAD BALLAST.

APPLICATION FILED OCT. 27, 1919.

Reissued Sept. 13, 1921. 15,195.

3 SHEETS—SHEET 3.

Witness

Edward T. Wray.

INVENTOR

Howell D. Pratt.

by his Attorneys

Parks & Earle

UNITED STATES PATENT OFFICE.

HOWELL D. PRATT, OF PHILADELPHIA, PENNSYLVANIA, ASSIGNOR TO LINK-BELT COMPANY, OF CHICAGO, ILLINOIS, A CORPORATION OF ILLINOIS.

MACHINE FOR CLEANING RAILROAD-BALLAST.

15,195. Specification of Reissued Letters Patent. Reissued Sept. 13, 1921.

Original No. 1,272,849, dated July 16, 1918, Serial No. 201,769, filed November 13, 1917. Application for reissue filed October 27, 1919. Serial No. 333,841.

*To all whom it may concern:*

Be it known that I, HOWELL D. PRATT, a citizen of the United States, residing in Philadelphia, Pennsylvania, have invented certain Improvements in Machines for Cleaning Railroad-Ballast, of which the following is a specification.

One object of my invention is to construct a machine for mechanically cleaning or screening railway ballast.

A further object of the invention is to provide a machine which can be located between the two tracks of a railroad so as to remove and screen the ballast at the point between the two tracks and also that raked into the space from between the ties.

A still further object of the invention is to design the machine so that the material screened from the ballast can be readily removed and deposited outside of the limits of the track or into cars.

In the accompanying drawings.

Figure 1:
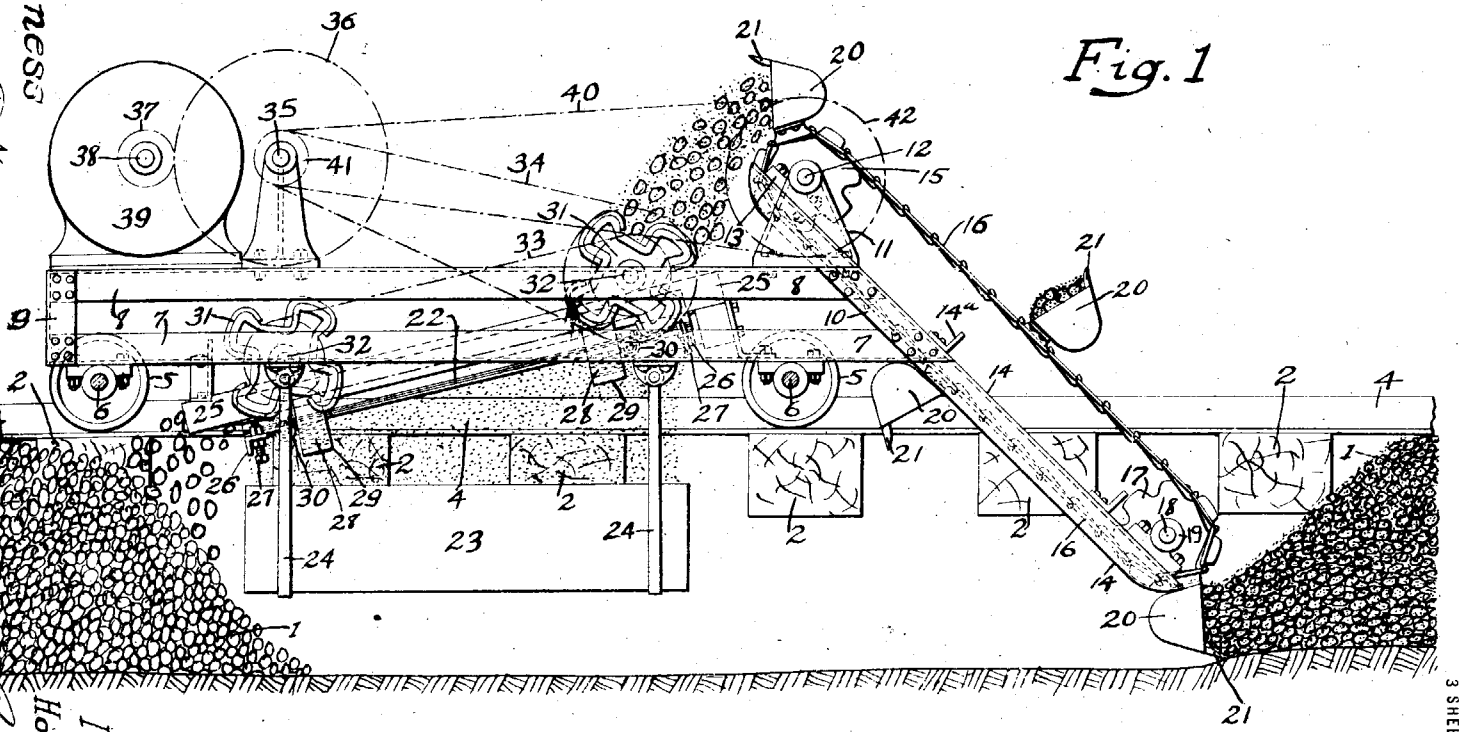
Figure 1 is a longitudinal sectional view through the roadbed showing my improved ballast cleaning machine in operation.
Figure 2:
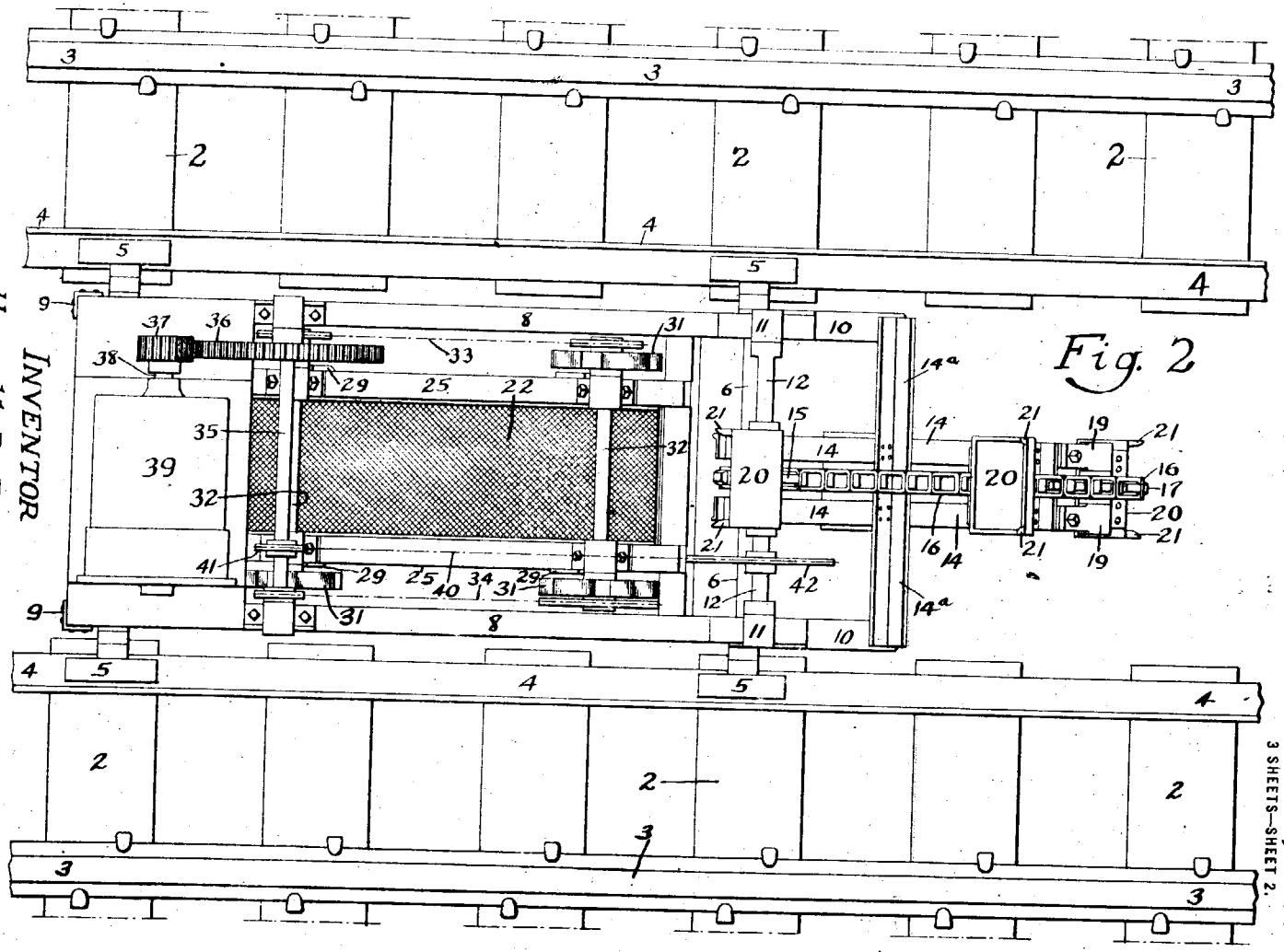
Fig. 2 is a plan view.

Referring to the drawings, 1 is the ordinary stone ballast of a railway. 2 are the ties and 3 are the rails of the tracks. These tracks are spaced a given distance apart, leaving a clear space between the ends of the ties, as shown, and this space is usually filled with stone ballast, as well as the space between the several ties of each track.

After the ballast has been placed in the spaces between the ties, it becomes filled with dirt and cinders to such an extent that the stones do not bind properly, one against the other, and in order to remove this dirt and cinder it has been the common practice to use manually operated forks for lifting the ballast and for sifting the dirt and cinders from the stone. By the use of my invention, the sifting by manual labor is entirely eliminated.

In the present instance, 4 are angle bars which form the rails on which my improved apparatus is supported. These rails can be permanently attached to the ties or they can be made removable, as desired, and while I have shown angle bars the rails may be made of wood, or other suitable material.

5 are flat wheels in the present instance, which are mounted on axles 6, supporting the lower frame 7 of my improved machine. Supported on this lower frame is an upper frame 8 connected to the lower frame by uprights 9 at the rear end and by diagonal members 10 at the forward end in the present instance. The construction may vary with the type of machine. Mounted on the forward end of the frame are brackets 11, carrying a shaft 12 on which are the bearings 13 for the diagonal beams 14, which carry the bucket elevator. A cross angle-beam $14^a$, in the present instance, is secured to the beams 14, and rests on the ends of the frame 7 and limits the downward movement of the elevator.

Mounted on the shaft 12 is a sprocket wheel 15 around which passes a chain 16. This chain passes around a sprocket wheel 17 mounted on a shaft 18 carried by bearings 19 on the lower ends of the beams 14. Secured to the chain at intervals are buckets 20 for receiving the ballast, and at the outer edge of the buckets are fingers 21, which readily pass under the ballast so as to loosen the stones, thus allowing them to pass freely into the buckets. The buckets discharge the stone, cinders, and other dirt, onto a screen 22, arranged at an incline directly back of the bucket elevator, and this screen can be agitated in any suitable manner so as to separate the cinders from the stones of the ballast. The stones are discharged from the rear of the screen into the trench formed by the machine, and the cinders, and other dirt, in the present instance, fall into a box 23, or other suitable receptacle, under the machine. In the present instance, the box is supported by stirrups 24, pivoted to the frame so that when the box is filled the operator can detach the box by moving the stirrups from under the box. Access may be had to the box from the front end of the machine by raising the elevator sufficiently and it may be held in its raised position by any suitable means.

The screen, in the present instance, consists of a fixed frame 25, in which the screen itself is movably mounted, and attached to this screen are angle bars 26 in which are threaded studs 27 to limit the upward movement of said screen, caused by the release of the coiled springs 28 after being compressed by the cam wheels 31 mounted on the shaft 32. These springs are carried by brackets 29 hung from the side members of the frame 25 of the screen, and on the screen are rollers 30, two at each side, in the present instance, which are located in the path of said cam wheel 31. These shafts are driven in unison by a drive chain 33, which passes around sprocket wheels on the said shafts, and one of these shafts is driven through a chain 34 from a transverse shaft 35 having a gear 36, which meshes with a pinion 37 on the shaft 38 of an electric motor 39, although it will be understood that any suitable motor may be used to drive the mechanism. The elevator is driven through a chain 40, which passes around a sprocket wheel 41, on the shaft 35 and a sprocket wheel 42 on the shaft 12.

It will be understood, however, that while I have shown in dotted lines one arrangement for driving the mechanism the mechanism may be driven in any suitable manner and by any suitable motor without departing from the essential features of the invention.

The operation of the machine is as follows:

If it be desired to clean the ballast of a double track road, the rails 4 for the machine are located in position on the ties, as shown. Then, a certain portion of the ballast is excavated and the machine is located in the excavated portion. The machine can be moved forward by hand, or it may be driven by power, if desired. The elevator is driven from the motor 39, and the buckets dig into the ballast in front of the machine and carry the detached particles of the ballast over the head of the elevator and discharge them onto the screen, and, as the screen is agitated, the material flows down on the screen and the fine dust and cinders are separated from the stone, falling onto the box or other receptacle, 23, while the stones are discharged into the trench at the rear of the machine.

This machine not only cleans the ballast in the space between the tracks, but also in the space between the ties of the two tracks, by an operator raking the ballast from the space between the ties to a position in the path of the elevators. This is comparatively easy, as there is no lifting, or sifting, of the ballast by hand. The clean ballast can be readily placed between the ties, as the machine is traveling forward.

Figure 3:
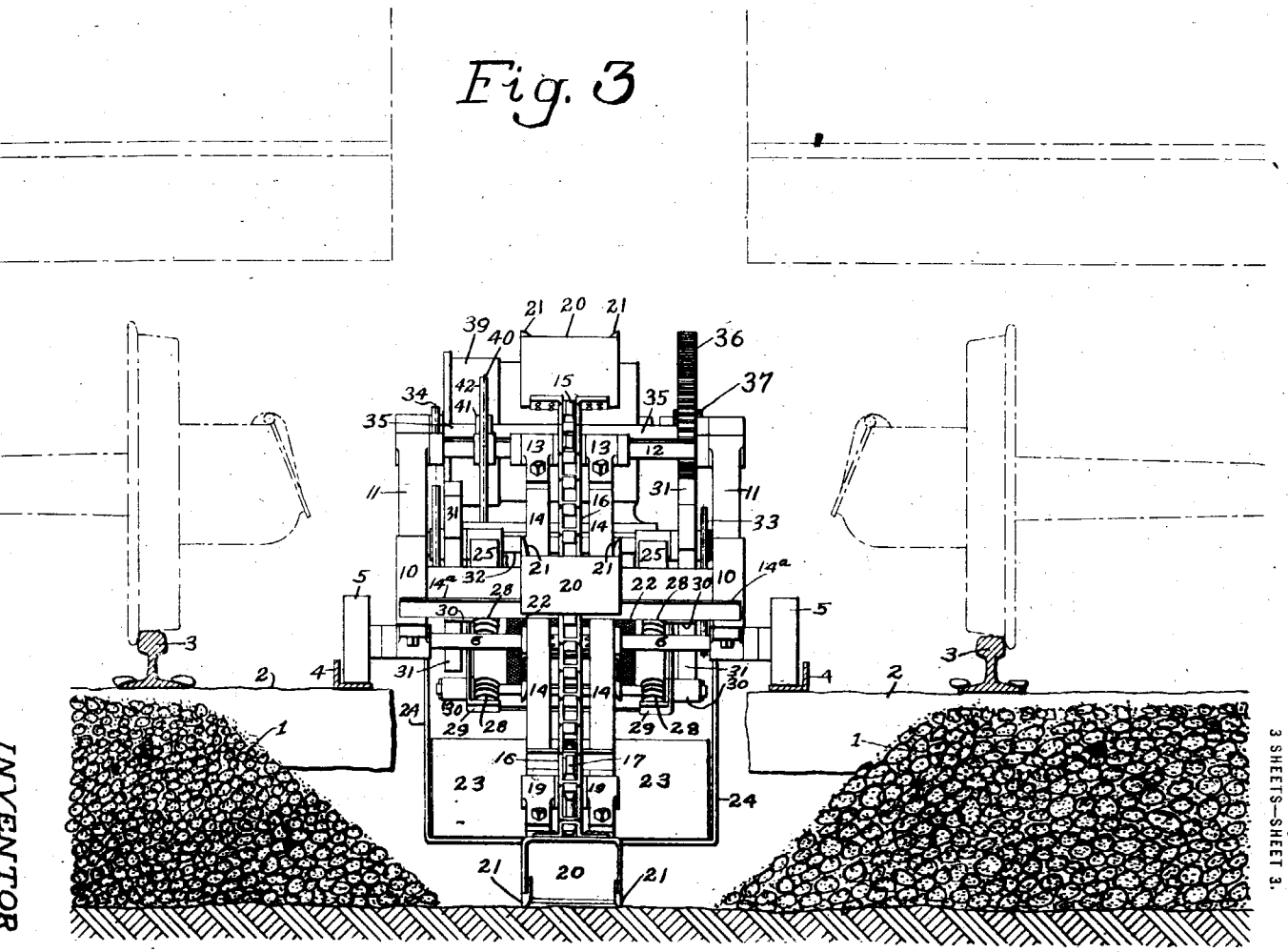
Fig. 3 is a transverse sectional view through the roadbed, showing the front end of the machine.

By manufacturing the machine as above described it can be built to be within the clear space between the cars on the two tracks, so that the machine need not be removed when trains are passing. This is clearly illustrated in Fig. 3, which shows the cars in dotted lines.

I claim:—

1. The combination in a machine for cleaning railroad ballast, of rails independent of the rails of the track and mounted on the projecting ends of the ties; a frame less in width than the space between the ties and having wheels arranged to travel on the rails; means on the frame for removing the ballast from the roadbed; means for screening the ballast and returning it to the roadbed; and means, carried by the frame, for receiving the fine material removed from the ballast, the frame and its mechanism being of such a width and height as to be within the clear space between the cars traveling on the two tracks.

2. The combination in a machine for cleaning ballast, of two tracks arranged side by side; rails on the adjoining ends of the ties of each track; and a frame having wheels adapted to the rails and located in the clear space between the cars traveling on the two tracks, said frame carrying means for cleaning the ballast between the tracks.

3. The combination in a machine for cleaning ballast, of two rails located on the inner ends of the ties of a double track railroad; a frame having axles provided with wheels adapted to the said rails; elevating means for lifting the ballast to be cleaned, a screen on which the ballast is discharged; means for agitating the screen; a removable receptacle suspended under the screen and arranged to receive the screenings from the ballast, the machine being so arranged that the ballast will be discharged at the rear end thereof, the entire mechanism being located on the frame in such position that trains can pass on either track without interfering with the frame and the mechanism carried thereby.

4. The combination in a machine for cleaning ballast, of a frame adapted to travel in the space between the tracks of a double track railroad; a bucket elevator located at the forward end of the frame; the elevator being mounted for pivotal adjustment; means for driving the elevator, a screen, mounted on the frame directly back of the elevator and arranged to receive the material as it is discharged from the elevator; a box hung under the screen; and stirrups pivoted to the frame and arranged to support each end of the box so that, on swinging the stirrups on the pivots, the box can be detached from the machine, the entire mechanism being located on the frame in such position that trains can pass on either track without interfering with the frame and the mechanism carried thereby.

5. The combination in a machine for cleaning ballast, of a frame arranged to travel in the clear space between the tracks of a double track railway; means on said frame for removing the ballast from the roadbed, means for screening the ballast and returning it to the roadbed, the entire mechanism being located on the frame in such position that trains can pass on either track without interfering with the frame and the mechanism carried thereby, and means for guiding the mechanism along a path parallel with the track.

6. The combination in a machine for cleaning ballast, of a frame arranged to travel in the clear space between the tracks of a double track railway, n. s on said frame for removing the ballast om the roadbed, means for screening the ballast and returning it to the roadbed, the entire mechanism being located on the frame in such position that trains can pass on either track without interfering with the frame and the mechanism carried thereby, and means fixed on the ties for guiding the mechanism along a path parallel with the track.

7. The combination in a machine for cleaning ballast, of a frame arranged to travel in the clear space between the tracks of a double track railway, means on said frame for removing the ballast from the roadbed, means for screening the ballast and returning it to the roadbed, the entire mechanism being located on the frame in such position that trains can pass on either track without interfering with the frame and the mechanism carried thereby, and means comprising rails fixed on the ties for guiding the mechanism along a path parallel with the track.

8. The combination in a machine for cleaning ballast, of a frame arranged to travel in the clear space between the tracks of a double track railway, means on said frame for removing the ballast from the roadbed, means for screening the ballast and returning it to the roadbed, the entire mechanism being located on the frame in such position that trains can pass on either track without interfering with the frame and the mechanism carried thereby, and means independent of the track rails for guiding the mechanism along a path parallel with the track.

9. The combination with a machine for cleaning ballast arranged to travel in the clear space between the tracks of a double railway, of means independent of the track ties for guiding it along a path parallel with the track, the entire mechanism being so arranged and positioned that trains can pass on either track without interfering therewith.

10. The combination with a machine for cleaning ballast arranged to travel in the clear space between the tracks of a double track railway, of means carried by and movable with the cleaning machine for guiding it along a path parallel with the track, the entire mechanism being so arranged and positioned that trains can pass on either track without interfering therewith.

11. The combination with a machine for cleaning ballast arranged to travel in the clear space between the tracks of a double track railway, of means for guiding it along a path parallel with the track, the entire mechanism being so arranged and positioned that trains can pass on either track without interfering therewith.

HOWELL D. PRATT.